United States Patent [19]

Conforti

[11] Patent Number: 4,674,036

[45] Date of Patent: Jun. 16, 1987

[54] DUPLEX CONTROLLER SYNCHRONIZATION CIRCUIT FOR PROCESSORS WHICH UTILIZES AN ADDRESS INPUT

[75] Inventor: Joseph A. Conforti, Phoenix, Ariz.

[73] Assignee: GTE Communication Systems Corporation, Phoenix, Ariz.

[21] Appl. No.: 674,212

[22] Filed: Nov. 23, 1984

[51] Int. Cl.⁴ .................. G11C 8/00; G06F 11/00
[52] U.S. Cl. ........................... 364/200; 379/279; 371/7
[58] Field of Search ... 364/200 MS File, 900 MS File; 179/18 ES, 18 EE; 379/279, 284; 371/7, 12, 67, 24, 68

[56] References Cited

U.S. PATENT DOCUMENTS

| | | | |
|---|---|---|---|
| 3,810,119 | 5/1974 | Zieve et al. | 364/200 |
| 3,943,494 | 3/1976 | Holmes | 364/200 |
| 4,128,881 | 12/1978 | Yamamoto et al. | 364/200 |
| 4,330,826 | 5/1982 | Whiteside et al. | 364/200 |
| 4,551,836 | 11/1985 | Parikh | 364/900 |
| 4,580,243 | 4/1986 | Renner | 364/900 |

*Primary Examiner*—Archie E. Williams, Jr.
*Assistant Examiner*—Lawrence E. Anderson
*Attorney, Agent, or Firm*—Frank J. Bogacz; Peter Xiarhos

[57] ABSTRACT

This circuit provides for synchronizing duplex copies of processor controllers. Either controller may be active in the simplex mode. That is, one controller is actively operating and controlling processors, while the other controller is in a standby mode. In this situation, the synchronization circuit synchronize its clock to itself. When a previously standby controller is made active, the control inputs of the standby controller are manipulated such that, the clock of the standby controller is synchronized to the already active a controller's clock. Once synchronism is achieved, the controllers are said to be operating in a synchronized duplex mode. The synchronization circuit of each controller then continuously checks to insure that the two controller copies are operating synchronously. If a non-synchronous condition is encountered by one of the synchronization circuits, the circuit that detected the lack of synchronization is repeatedly forced to a particular memory location. After a short time interval, the opposite synchronization circuit will eventually be at this same location and synchronous duplex operation will again result.

8 Claims, 2 Drawing Figures

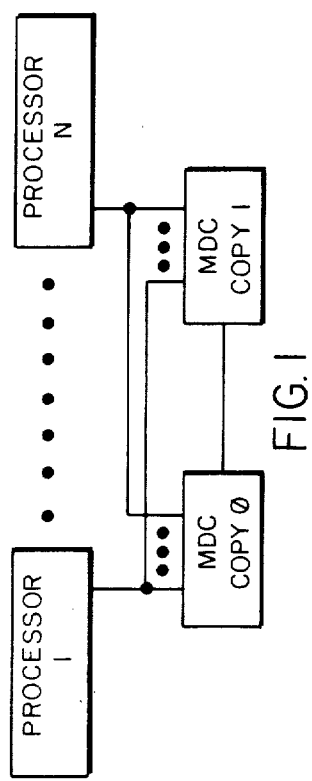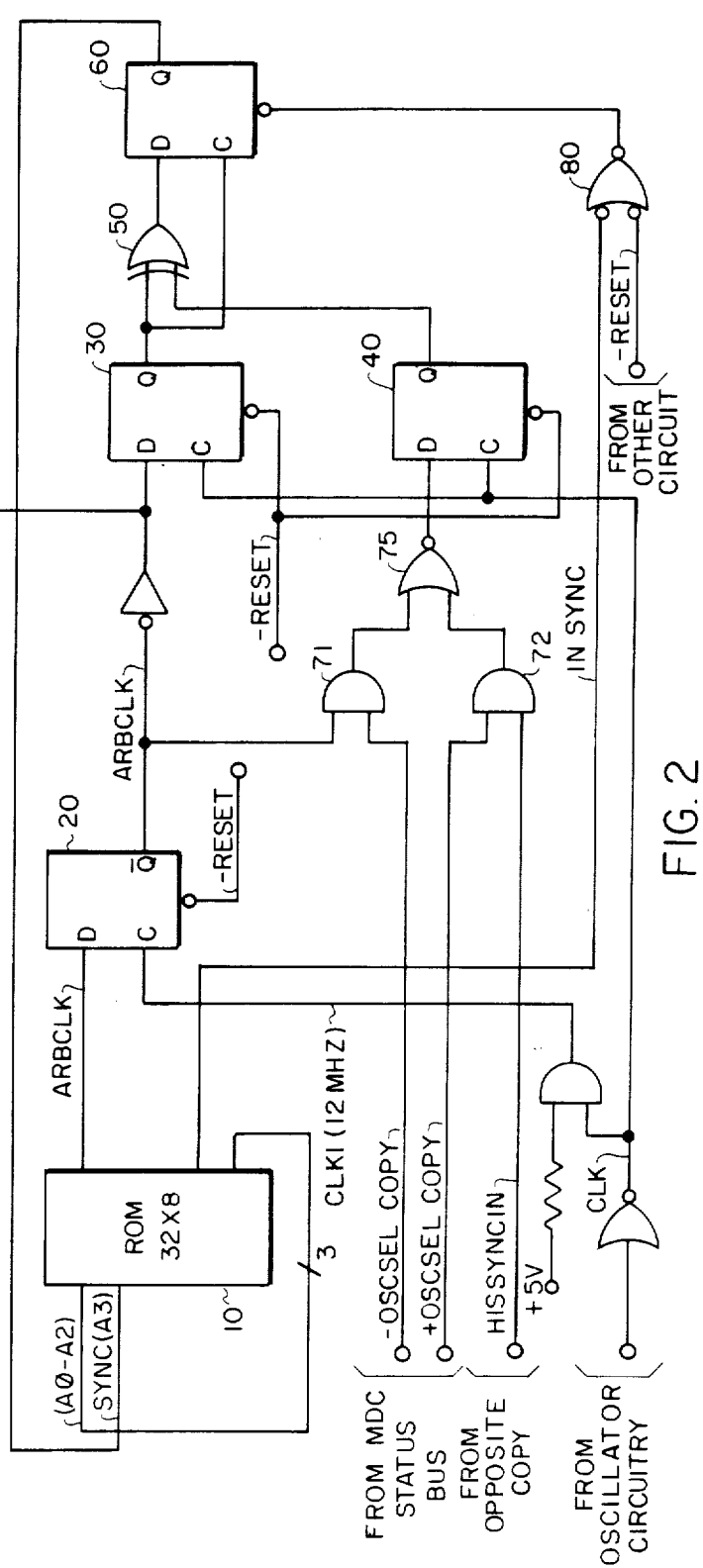

DUPLEX CONTROLLER SYNCHRONIZATION CIRCUIT FOR PROCESSORS WHICH UTILIZES AN ADDRESS INPUT

BACKGROUND OF THE INVENTION

This invention pertains to synchronization of duplex processor equipment and more particularly to a circuit for continuously synchronizing duplex processor controllers.

In modern electronic switching, a great number of telephone subscribers are connected to the international switching network via computer controlled electronic switching systems. Such electronic switching systems typically have fault tolerant systems at critical points to insure continuous operation of the system. These switching offices have a reliability requirement due to the public policy of providing telephone service 24 hours a day on an uninterrupt basis. Since the central processing unit (CPU) is the heart of the switching system, the CPU arrangement must be a fault tolerant one. Typical solutions to this problem have been to provide redundant equipment. This redundant equipment must run synchronously, that is, each CPU must perform the same task at the same time. If the processors are not operated synchronously then, for a fault in one processor, service is temporarily interrupted while the other processor is placed on-line and active. In addition, other interface and control equipment which is operated by the central processors is also synchronously operated.

It is required that these processor controllers also operate synchronously and continuously monitor their synchronous operation. Furthermore, it is desirable that these processor controllers automatically and quickly resynchronize themselves for any detected lack of synchronization.

Typical synchronizing systems count clock pulses and modulate the resulting clock outputs by adding or deleting clock pulses, as required. The synchronization circuits which employ these pulse counting techniques are typically complex and difficult to maintain. Further, if a timing parameter is changed, the entire design of the counting circuit must be altered to reflect this change.

SUMMARY OF THE INVENTION

A fault tolerant processor system which includes a clock has plurality processors connected to at least two synchronously operating processor controllers. Each processor controller has a circuit for synchronizing duplex operation of the processor controllers.

The circuit for synchronizing has a sequencer which is cyclically operated to produce a number of address output signals, a controller clock signal and a clear signal. The address output signals are transmitted via a number of address leads to address inputs of sequencer. A number of address leads provide for this connection. The address input signals serve to operate the sequencer to produce a next sequence of operation and corresponding output signals.

The circuit also has a selector, which is connected to the sequencer and to the other circuit for synchronizing located as part of the other processor controller. The selector operates in response to the controller clock signal to transmit a particular selected controller clock signal.

A detector is connected to the clock, to the sequencer and to the selector. The detector operates in response to the controller clock signal of the sequencer and to the particular selected controller clock signal of the selector to determine whether a miscomparison of these controller clock signals exists and to produce a corresponding miscomparison signal. An indicator is connected between the detector and the sequencer and provides for producing an address input signal in response to the miscomparison signal.

The sequencer is operated in response to the address input signal to produce a particular fixed next sequence of address output signals, controller clock signal and clear signal, until such time as the other synchronization circuit produces these same output signals; thereby, placing the two processor controllers in synchronization.

A BRIEF DESCRIPTION OF THE DRAWINGS

FIG. 1 is a block diagram of a multiprocessor configuration which controls synchronous duplex process or controllers embodying the present invention.

FIG. 2 is a schematic diagram of the synchronization circuit contained in each processor controller of FIG. 1.

DESCRIPTION OF THE PREFERRED EMBODIMENT

Referring to FIG. 1, a number of processors, processor 1 through processor N, are shown connected to two synchronously operating message distributor complex copies (MDC copy 0 and MDC copy 1). Each processor is cross-connected to both MDC copies (copies 0 and copy 1). The MDC copies operate to control other circuitry (not shown), which also operates synchronously.

Processor 1 controls the operation of the two copies of the MDC. That is, processor 1 may operate MDC copy 0 in a simplex mode; it may operate MDC copy 1 in a simplex mode or it may operate both MDC copies 0 and 1 in a duplex synchronous mode.

A status register in each MDC which is connected to processor 1 indicates whether that MDC is to synchronous its clock to itself for simplex operation or to synchronize its clock to the other copy for duplex operation. Only processor 1 controls the operation of the status registers, since it is an administrative processor. Each of the processors is cross-connected to both MDC copies for synchronous duplex operation.

Referring to FIG. 2, a synchronization circuit which is part of each MDC copy is shown. Read only memory (ROM) 10 is a 32×8 bit device. ROM 10 has its three low order input address bits connected to three specific outputs bits of the ROM. These bits are A0 through A2. A fourth address bit A3 is the SYNC signal which is connected to the Q output of D-type flip-flop 60. These four address bits from the four low order address bits supplied for reading from ROM 10.

Other outputs of ROM 10 include a bit which is termed the IN SYNC bit. This bit indicates that the addresses through which ROM 10 is presently reading or sequencing is synchronized to the other copy or to its own clock copy. Another signal, the low order output bit of ROM 10, isthe ARBCLK signal. This signal is used to monitor the synchronism of the two MDC copies. In addition, the D-type flip-flop 20 is connected via the ARBCLK lead to ROM 10. The data transfer via ARBCLK lead is input to the D input of flip-flop 20. The clock input of flip-flop 20 is connected to the oscillator circuitry (not shown), which provides a 12 MHZ clock signal to operate the MDC circuitry.

The $\overline{Q}$ output of flip-flop 20 is connected to the D-type flip-flop 30. A clock signal from the oscillator circuitry is connected via the CLK lead to the clock input of flip-flops 20, 30 and 40. The Q output of flip-flop 30 is connected to exclusive OR gate 50 and to the clock input of flip-flop 60. The Q output of flip-flop 60 is connected via the SYNC lead to ROM 10 as address input bit A3.

The MYSYNCOUT lead of this synchronization circuit is connected to the opposite copy synchronization circuit via the HISSYNCIN lead to AND gate 72 of the other synchronization circuit. The MYSYNCOUT Lead of each MDC copy is cross-connected to the HISSYNCIN lead of the opposite copy of the MDC. This allows for one copy to synchronize to the other copy for synchronous duplex operation. A signal from the MDC status register is transmitted to AND gate 72 via the +OSCSELCOPY lead to indicate that synchronization to the other circuit is to be performed. Another signal from the MDC status register is transmitted to AND gate 71 via the −OSCSELCOPY lead to indicate that the circuit is to synchronize to itself. In addition, AND gate 71 is connected to the Q bar output of flip-flop 20.

AND gates 71 and 72 are connected to OR gate 75. OR gate 75 is connected to the D input of flip-flop 40. The Q output of flip-flop 40 is connected as another input to exclusive OR gate 50.

The 12 MHZ clock from the oscillator circuitry is connected via the CLK lead to the clock inputs of flip-flops 20, 30 and 40. A signal is transmitted via the reset lead to flip-flops 20, 30 and 40 in order to clear these flip-flops. In addition, this reset signal is transmitted to OR gate 80 where it is combined with the IN SYNC signal from ROM 10 to clear flip-flop 60.

When the synchronization circuit is initialized, ROM 10 is activated and its address is forced to location 0. ROM 10 may be programmed as shown in Table 1 below.

TABLE I

| LOCATION (HEX) | CONTENTS | | | | |
| --- | --- | --- | --- | --- | --- |
| | A2 | A1 | A0 | IN SYNC | ARBCLK |
| 0 | 0 | 0 | 1 | 1 | 1 |
| 1 | 0 | 1 | 0 | 1 | 1 |
| 2 | 0 | 1 | 1 | 1 | 1 |
| 3 | 1 | 0 | 0 | 1 | 0 |
| 4 | 1 | 0 | 1 | 1 | 0 |
| 5 | 1 | 1 | 0 | 1 | 0 |
| 6 | 1 | 1 | 1 | 1 | 0 |
| 7 | 0 | 0 | 0 | 1 | 0 |
| 8 | 0 | 1 | 1 | 0 | 1 |
| 9 | 0 | 1 | 1 | 0 | 1 |
| A | 0 | 1 | 1 | 0 | 1 |
| B | 0 | 1 | 1 | 0 | 1 |
| C | 0 | 1 | 1 | 0 | 1 |
| D | 0 | 1 | 1 | 0 | 1 |
| E | 0 | 1 | 1 | 0 | 1 |
| F | 0 | 1 | 1 | 0 | 1 |

ROM 10 is programmed, such that, normally it will sequence from a location 0 through 7 and back to location 0 in a cyclic fashion. Two other output bits of ROM 10, which provide control functions for other circuitry, are not shown. Values are output by ROM 10 on the ARBCLK lead as indicated in Table 1. At each 83 nanosecond interval, the signal on the CLK lead causes flip-flop 20 to latch the value of the ARBCLK signal. The $\overline{Q}$ output of flip-flop 20 is then latched as a data input by flip-flop 30.

If the two MDC copies are synchronously operating in duplex mode, a signal via the HISSYNCIN lead will be transmitted through AND gate 72, through OR gate 75 on the same clock cycle as that which flip-flop 30 has latched the ARBCLK signal of this circuit. The signal transmitted via the HISSYNCIN lead is the ARBCLK signal of the opposite MDC copy. Flip-flop 40 stores the value the opposite copy ARBCLK. Exclusive OR gate 50 provides a true output for a miscomparison of the ARBCLK signals of the two MDC copies.

As a result, flip-flop 60 latches a logic 1 value and transmits this value via its Q output and via the SYNC lead to ROM 10. As long as a mismatch exists, address bit A3 becomes a logic 1 on the CLK cycle. Therefore, a value of 8 will be added to whatever the next sequential ROM address happens to be. For example, if the next sequential ROM address (between 0 and 7) was location 3, which indicated an address of location 4 in bits A0 through A2, then 8 would be added to address 4 and the next address to be fetch would be address 8 plus 4 or address C (HEX).

As can be seen from Table 1, address C contains the location 3 in address bits A0 through A2. In addition, the value of the IN SYNC bit is 0. This value of the IN SYNC bit will cause gate 80 to produce a logic 1 which will clear flip-flop 60 for one cycle. Thereby, the SYNC lead which is the address bit A3 will be at logic 0 and the address bits A0 through A2 will contain the value of location 3 for the next read access from ROM 10. For each read cycle of ROM 10 in which the ARBCLK signals of the respective synchronization circuits of the two copies miscompare, the circuit, which was instructed to synchronize to the other copy, will produce the miscomparison indication in flip-flop 60 and as a result be forced to read from location 3. This process will be cyclically repeated until both synchronization circuits are reading from location 3 and are, therefore, in full duplex synchronization.

For beginning duplex operation, in which one MDC copy is active and the other copy was out of service and is being put into service, the active synchronization circuit will be synchronizing to itself. The active synchronization circuit will have the −OSCSELCOPY signal set to enable AND gate 71, so that the ARBCLK signal of the synchronization circuit will be compared against itself. The MDC copy which is being put into service will have the +OSCSELCOPY signal set to enable AND gate 72 to synchronize its ARBCLK signal to the ARBCLK signal of the opposite copy. For simplex operation, the active synchronization circuit has the status bit −OSCSELCOPY signal set so that it synchronizes to its own ARBCLK signal.

In addition, a reset signal is applied via the reset lead to clear each of the flip-flops 20, 30, 40 and 60. This reset signal is developed by other MDC circuitry (not shown).

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a fault tolerant processor system including a clock, a plurality of processors is connected to at least two synchronously operating processor controllers, including one and another processor controller, each processor controller including a circuit for synchronizing, said circuit for synchronizing said processor controllers comprising:

sequencing means cyclically operated to produce a plurality of address output signals, a controller clock signal and a clear signal, said plurality of address output signals being transmitted via a plurality of address leads connecting said address outputs to a corresponding plurality of address inputs to produce a plurality of address input signals to further operate said sequencing means;

means for selecting a selected controller clock signal connected to said sequencing means and to a circuit for synchronizing said other processor controller, said selecting means being operated in response to a controller clock signal of said other processor controller to transmit said selected controller clock signal;

detecting means connected to said clock, to said sequencing means and to said selecting means, said detecting means operated in response to said selected controller clock signal of said sequencing means and to said selected controller clock signal of said detecting means of said other processor controller to determine a miscomparison of said controller clock signals and to produce a miscomparison signal in response to said miscomparison;

indicating means connected between said detecting means and said sequencing means, said indicating means being operated in response to said miscomparison signal to produce an add eight address input signal;

said sequencing means being further operated in response to said add eight address input signal to produce a fixed next sequence of said address output signals, said controller clock signal and said clear signal; and said selecting means being further connected to at least one processor of said plurality and said selecting means being operated to transmit said controller clock signal of said other processor controller or to transmit said controller clock signal of said sequencing means to said detecting means.

2. A circuit for synchronizing as claimed in claim 1, wherein there is further included clearing means connected to said indicating means and to said sequencing means, said clearing means being operated in response to said clear signal of said sequencing means to inhibit production of said add eight address input signal.

3. A circuit for synchronizing as claimed in claim 2, said sequencing means including memory means being operated to cyclically read and transmit a plurality of information bits.

4. A circuit for synchronizing as claimed in claim 3, said memory means including a read only memory.

5. A circuit for synchronizing as claimed in claim 4, said detecting means including:

first latching means connected to said clock, to said read only memory via said controller clock signal lead and to said selecting means of said other circuit for synchronization;

second latching means connected to said first latching means and to said clock; and exclusive OR means connected to said second latching means, to said selecting means and to said indicating means.

6. A circuit for synchronizing as claimed in claim 5, said selecting means including:

first AND gating means connected to said processor and said first latching means;

second AND gating means connected to said processor and to first latching means of said other processor controller circuit for synchronizing;

first OR gating means connected to said first and second AND gating means; and third latching means connected to said clock to said first OR gating means and to said exclusive OR gating means.

7. A circuit for synchronizing as claimed in claim 6, said indicating means including fourth latching means connected to said exclusive OR gating means, to said second latching means and to said read only memory.

8. A circuit for synchronizing as claimed in claim 7, said clearing means including second OR gating means having inverted inputs and inverted outputs, said second OR gating means being connected to said read only memory via said clear signal lead and to said fourth latching means.

* * * * *